United States Patent [19]

Longworth

[11] 3,846,530

[45] Nov. 5, 1974

[54] TAPE SPOOL

[75] Inventor: Michael W. Longworth, Glendale Heights, Ill.

[73] Assignee: Ampex Corporation, Redwood City, Calif.

[22] Filed: Oct. 31, 1972

[21] Appl. No.: 302,513

[52] U.S. Cl. .................. 264/154, 264/153, 264/163, 264/295

[51] Int. Cl. .............................................. B29d 31/00

[58] Field of Search ............. 264/295, 296, DIG. 66, 264/163, 153, 154–156; 242/71.8

[56] References Cited

UNITED STATES PATENTS

| | | | |
|---|---|---|---|
| 2,749,603 | 6/1956 | Trusell | 264/153 |
| 2,900,667 | 8/1959 | Longenecker | 264/153 X |
| 3,502,761 | 3/1970 | Dimitracopoulos | 264/163 X |
| 3,509,613 | 5/1970 | Koenig | 264/295 X |
| 3,617,010 | 11/1971 | Coy | 242/55.19 |

*Primary Examiner*—Richard R. Kucia

[57] ABSTRACT

A tape spool for supporting an endless magnetic tape in a magnetic tape cartridge is cold formed from a single piece of flat plastic stock with upstruck hub segments of a predetermined configuration. The spool also is formed with a central bent configuration including a cylindrical portion for journaling the spool for rotation on a spindle in the cartridge. The preferred hub segments are upstruck from an annular platform which supports a coil of magnetic tape and leave openings in the platform. Each of the hub segments is bent to have an arcuate curvature and collectively define a cylindrical guiding surface for the tape having an upper diameter larger than a collective diameter defined by the lower portions of the hub segments joined to the platform at bent hinge areas.

6 Claims, 4 Drawing Figures

TAPE SPOOL

This invention relates to spools used in magnetic tape cartridges which support an endless magnetic tape and to methods of making such spools.

In spools of this kind, such as the spool disclosed in U.S. Pat. No. 3,617,010, issued to Don R. Coy on Nov. 2, 1971, and endless array of magnetic tape is coiled and is carried on flat tape platform which revolves about a central axis through the spool. The tape is payed out from an inner winding of the coil at an upstanding hub extension for the spool which has a larger diameter at the upper end thereof than at its lower end which is integrally joined to the spool platform. After usage the tape returns to the outer edge of the platform and is rewound as an outer winding of the coil on the platform.

The spool disclosed in the aforementioned patent is a one piece spool formed of plastic by an injection molding technique. This one piece spool eliminated the need to form several separate spool pieces and assembling operations needed to make the multi-piece spool then in use in magnetic tape cartridges. While tape spools made in accordance with U.S. Pat. No. 3,617,010 are satisfactory, it has been desired to provide an even lower cost spool, preferably one which could be manufactured more quickly than with the injection molding equipment used to make the above described spools.

Accordingly, a general object of the present invention is to provide an improved method of forming a spool of the foregoing kind for an endless tape cartridge.

Another object of the invention is to cold form from a flat sheet of plastic stock a tape spool of the foregoing kind.

These and other objects and advantages of the present invention will become apparent from the following detailed description when read in connection with the accompanying drawings of which:

Figure 1:
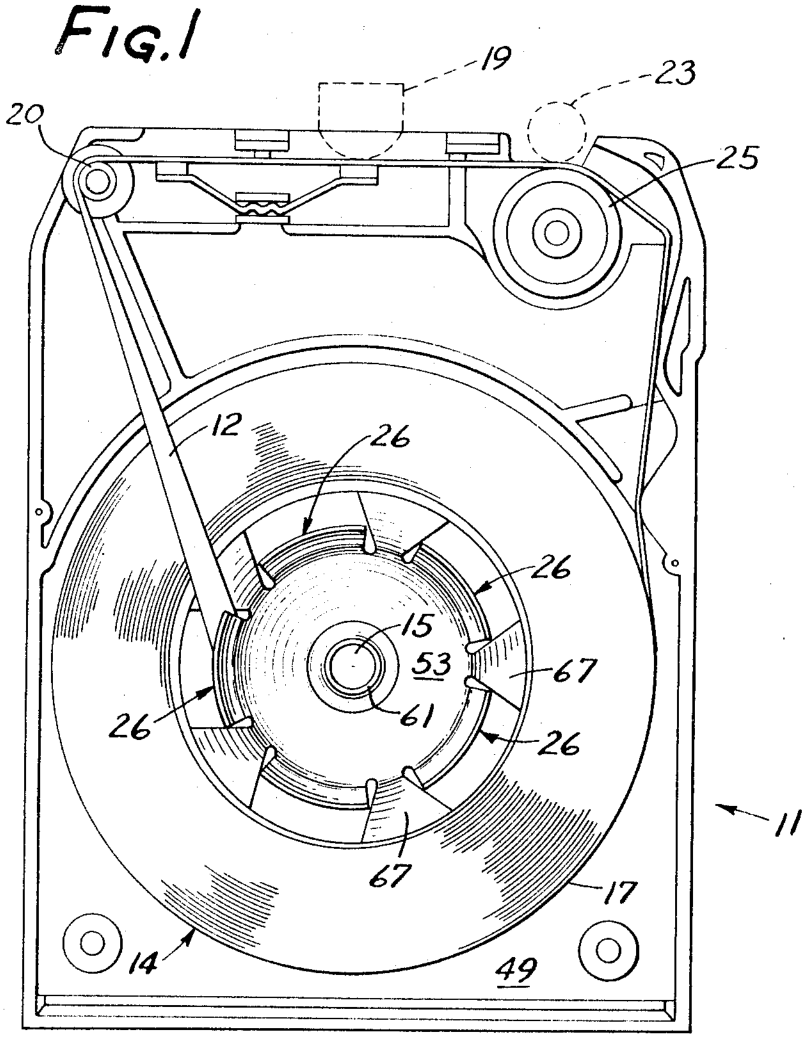
FIG. 1 is a plan view of a cartridge containing a spool embodying the present invention.
Figure 2:
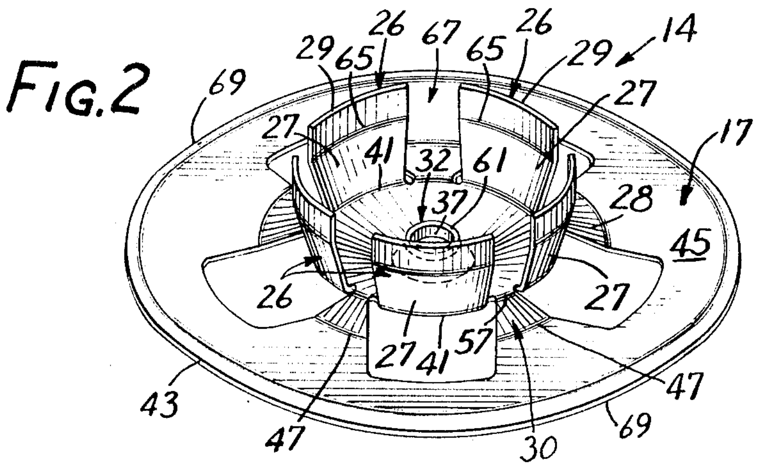
FIG. 2 is a perspective view of the tape spool of FIG. 1.

As shown in the drawings for purposes of illustration, the invention is embodied in a magnetic tape cartridge 11 of a known construction in which a magnetic tape 12 is provided in an endless array with most of the tape being wound in a roll or coil carried on a rotatable spool or reel 14 for rotation about a vertical axis through a stationary spindle 15 fixed to the cartridge. The tape is carried on a platform 17 of the spool and paid out from the center of the coil at a hub 18 to travel forwardly to and about a guide roller 20, FIG. 1, and then to travel past a sound transducer head 19 and through the nip of a tape driving capstan 23 and pressure roller 25 for returning as an outermost winding on the coil. The tape hub is formed of a plurality of hub segments 26 integral with the platform 17 and projecting upwardly therefrom. As an inner convolution of the tape 12 slides along the platform 17, it moves along an upwardly inclined inner arcuate section 28 of the platform to a reversely inclined generally vertical surfaces 27 on the hub segments 26, as best seen in FIG. 2. The tape 12 rises along the hub segments to the upper hub extensions 29 which collectively define a cylindrical surface having a diameter larger than the diameter collectively defined by the inclined surface 27.

Figures 3, 4:
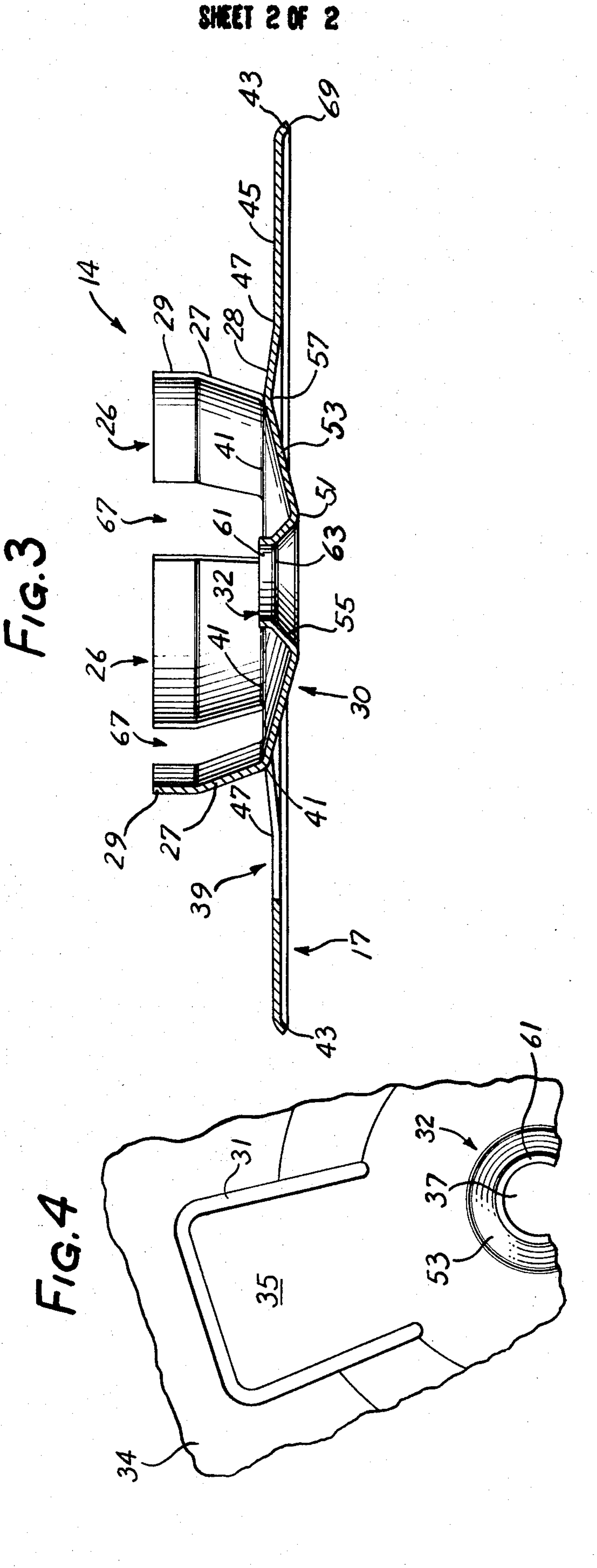
FIG. 3 is an enlarged sectional view of the tape spool of FIG. 2.
FIG. 4 is an enlarged fragmentary, plan view of one portion of the tape spool during one phase of the manufacture thereof.

In accordance with the present invention, spools 14 meeting the rigorous standards and specifications required by industry for handling endless magnetic tapes in a tape cartridge may be cold formed or stamped from a flat, thin sheet of plastic stock and formed with a platform 17, an upstanding hub 18 and a central configuration 30 including means 32 for journaling the spool for rotation on the spindle 15. As will be explained in greater detail, the spool 14 may be cold formed by a method comprising the steps of: piercing a sheet of flat plastic stock 34, FIG. 4, to sever slots 31 therein about hub elements 35 which are to be formed into the hub segments 26 and to punch out a central spindle-receiving opening 37 in the plastic sheet stock 34, deforming a central configuration in the plastic sheet stock including the spindle journaling means 32, and bending the hub elements 35 to constitute upstanding hub segments 26 which define an upstanding cylindrical hub surface for guiding the tape to rise and leave the spool. In this preferred embodiment of the invention, the slots 31 are pierced to be generally U-shaped and when the hub segments 26 are upstruck openings 39 of generally rectangular shape, as best seen in FIG. 2, are left in the platform 17. Also, as best seen in FIG. 2, each of the hub segments 26 is integrally attached to the central configuration 30 by means of integral bend or hinge area 41. Each of the flat planar hub elements 35 is also bent with an arcuate curvature, which after upstriking, is located equidistantly from the spool axis with the other hub segments and defining an arcuate portion of a virtually cylindrical guiding surface for the tape.

Of particular importance to the method is the overcoming of the previous orientation of the plastic in the sheet stock 34 and particularly its "memory" characteristic, i.e., a "characteristic" return to its original condition after being deflected therefrom during the cold working process. Not only must the hub segments be upstruck to almost 90° from their original flat planar state; but it is necessary that the circumferentially extending surfaces 29 and 27 thereon be bent to assume an arc and to be aligned with each other in a circular array to define a cylindrical hub for the tape. Also, such plastic sheet stock is typically purchased in large rolls which leave residual stresses from the rolled condition in the sheet stock. Consequently when the spool disk stock 34 is severed from such a strip, these residual stresses are no longer retained and are free to deform the platform 17. To overcome this, means such as ribs, ridges or flanges may be formed in the sheet stock to add rigidity to overcome the tendency to bend the platform because of these residual stresses. As will be explained, means in the form of a depending flange 43 is used herein to add rigidity to the spool to alleviate warping or bending.

From the standpoint of increasing the speed of manufacture of the spool 14, the piercing, deforming and upstriking steps may be formed by a progressive die in a stamping press making each of the piercing, deforming and bending operations in rapid succession at the same station rather than using several separate dies at different locations. The separate handling in transporting, inserting, orienting and removing of the spool stock 34 at several and various stations or locations will be a slower process than the progressive die kind of process. Also, it is to be understood that the preferred sequence of piercing slots 31, then deforming the central configuration 30, and then forming the hub segments 26 may be varied from the described sequence of steps and still fall within the purview of the present invention.

Referring now in greater detail to the illustrated embodiment of the invention, the spool 14 is formed from a plastic material such as an acrylonitrile-butadiene-styrene plastic sold as ABS by Marbon Div. of Borg-Warner Corp., Washington, West Virginia or polyethylene having a thickness in the range of about 0.020–0.030 inch. The ABS plastic is preferred in that the spool has good dimensional stability after cold forming.

The platform 17 includes a generally flat horizontal annular section 45 in the plane of the original plastic stock and from which is upwardly bent the inclined, inner annular section 28 which intersects the annular section 45 at a circular line 47. Thus, the convolutions of the tape 12 moving across the outer annular section 45 to the line 47 gradually rise along the horizontally inclined annular section 28 and begin to separate from the pack or coil. The lower edges of the tap convolutions will be unsupported at the rectangular openings 39 in the platform 17; but the area of the platform 17 is sufficient to support the coils of the tape pack from falling or bending down through these openings in the platform. The openings 39 serve as a savings in plastic material for the spool 14 as contrasted to the prior art injection molded spools which lack such openings in their platforms. Also, the thinner cross section for the cold formed spool 14 as compared to the injected molded spools results in less plastic being used.

To facilitate turning of the tape spool 14 on a lower cartridge wall 49, the central configuration 30 is formed with a downwardly projection circular area 51 (FIG. 3) which projects downwardly to a greater extent than does the outer depending flange 43 from the plane of the platform 17. The circular area 51 is curved and formed at the juncture of a dish-shaped annular section 53 extending from the hub segments 26 to a conical section 55 for the spindle means 32. At its larger diameter, the dish-shaped section 53 meets the upwardly inclined annular section 28 at a circular line 57 on which are also located the hinge areas 41 for the hub segments 26.

For the purpose of journaling the spool 14 on the spindle 15, the spindle means 32 comprises an upper cylindrical sleeve 61 which is centered at the axis of the spool and on the axis of the spindle 15 when the spool 14 is placed in the cartridge 11. The sleeve 61 provides the bearing surface for journaling the spool on the spindle 15 and is joined at circular shoulder line 63 to the conical section 55 of the spindle means 32.

After piercing the U-shaped slots 31 and the spindle opening 37, the plastic sheet stock 34 is still flat in the preferred embodiment of the invention. In the deforming of the central portion of the disc-shaped flat stock 34 is bent to form the upwardly inclined arcuate section 28, the adjoining dish-shaped section 53, the conical section 55 and the sleeve 61. Also, the depending flange 43 is formed at this time; but the hub elements 35 have not yet been bent to form the inclined surfaces 27 or the hub extensions 29 nor have they been curved into arcs centered on the spool or upstruck from the dish-shaped section 53. Alternatively, the inclined surfaces 27 and hub extensions 29 could be formed with their arcuate curvatures and their juncture line 65 at the time of deforming the central configuration rather than subsequent thereto.

In the operation of bending of the hub segments 26, the hub extensions 29 are bent in the hub elements 35 at a bend line 65 relative to the inclined surfaces 27. The flat planar hub elements 35 are also bent arcuately from the flat planar condition. Finally, the hub elements 35 are upstruck to form hinge areas 41 with the platform thereby providing the hub segments 26 spaced from each other by gaps 67 and spaced equidistantly from the spool axis.

By way of example only, a tape spool 14 may be constructed in accordance with the invention with the following dimensions. The spool 14 may have a radius from the center axis to the outer peripheral edge of the platform of 1.875 inches with the hub extensions 29 defining a diameter of 1.75 inches at the top of the hub 18. The five rectangular openings 39 have an outer circumferentially extending outer edge located at about a radius of 1.375 inches and inner edge at a radius of 0.875 inch and a width of 0.762 inch. The hub segments 26 each have a width of about 0.750 inch. The U-shaped slots 31 when initially formed have a width of about 0.06 inch about the hub elements 35. The depending flange 43 about the periphery of the platform 17 may be formed with a 0.09 inch radius and project downwardly approximately 0.062 inch from the top surface of the platform section 45.

The central configuration 30 in the illustrated embodiment of the invention has a spindle opening 37 in the range of 0.318–0.323 inch. The conical section 55 has a 45° inclination to the vertical and at the circular area 51 at the bottom of the spool for resting on the cartridge wall 49 has a diameter of about a 0.50 inch. The total height of the spool from the upper edge of the hub segments 26 to the circular area 51 for resting on the cartridge wall 49 is about 0.590 inch with the circular area extending downwardly about 0.093 inch from the top surface of the annular section 45 of the platform 17. The line 57 between the dish-shaped section 53 and the inclined arcuate section 28 projects upwardly about 0.030 inch from the top surface of the arcuate section 45 and this bend line 57 is located at a 1.062 inch radius.

In the illustrated embodiment of the invention, the inclined sections 28 of the hub segments 26 are disposed at a 20° angle to the vertical and extend to a height located 0.413 inch above the circular area 51 at the bottom of the spool. As stated above, these dimensions are given by way of example only and the spool may have other conformations or other dimensions and still fall within the purview of the invention.

In this embodiment of the invention, the plastic stock is ABS plastic about 0.030 inch in thickness and is provided in a coiled strip. After the hub segments 26 are upstruck and the spool is completed, the peripheral edge 69 is formed with cutting of the spool 14 from the strip. Alternatively, circular disks may be cut from the sheet stock for insertion into the stamping press. Leaving the spool attached to the strip is preferred as this assists in formation with a progressive die operation. Additional reinforcing ribs (not shown), for example circular ribs, may be formed in the platform to add rigidity for resisting warping of the spool.

From the foregoing it will be seen that a spool may be formed from a sheet of plastic rather than injected molded and still meet the necessary rigid standards for handling an endless magnetic tape. The preferred spool is stamped by a stamping press having multiple dies which do the piercing, deforming and bending operations quickly and automatically.

While one embodiment of the invention has been shown and described, it should be apparent that various modifications may be made therein without departing from the spirit and scope of the invention. Various of the features of the invention are set forth in the claims which follow.

I claim:

1. A method of forming a tape spool from a substantially flat sheet of plastic stock for supporting a coil of endless magnetic tape for use in a magnetic tape cartridge, said method comprising the steps of: piercing a sheet of flat plastic stock and forming a central spindle receiving opening at an axis for the spool, cutting pairs of outwardly extending slits each joined with an outer transverse slit in said sheet at locations about said spindle receiving opening to define therebetween hub portions for bending about inner portions integrally attached to remainder of the flat plastic sheet, deforming a central configuration in the plastic sheet from its flat planar condition to provide a spindle collar surface for bearing against the spindle for journaling the spindle for rotation in the cartridge and deflecting a portion of said sheet downwardly to form a surface for resting on the cartridge when the spindle is rotating, bending an arcuate cross section for each of said hub segments to define collectively a generally cylindrical surface about said axis for guiding the tape and bending said hub portions upwardly from the plane of said sheet about said integral inner portions to positions upstanding from the plane of said flat sheet to form a series of hub segments spaced circumferentially about said spindle receiving opening for supporting a coil of magnetic tape and leaving openings in a flat platform portion of said sheet and aligning said upwardly bent segments to define an upstanding hub from which tape may be payed out from the spool.

2. A method in accordance with claim 1 including the further step of bending portions of the platform to provide means for reinforcing and adding rigidity to said platform.

3. A method in accordance with claim 1 including the step of bending said hub segments to define inner lower portions inclined to the vertical and upper portions having arcs defining a diameter larger than that for the lower portions.

4. A method in accordance with claim 1 in which said deforming said central section includes the steps of bending an upwardly inclined arcuate section for guiding tape to said hub, bending downwardly an annular section within the hub segment locations and bending upwardly at the inner portion of the latter said spindle bearing surface.

5. A method in accordance with claim 1 including the step of severing a circular disc-shaped piece from said plastic sheet prior to said piercing and bending.

6. A method of forming a tape spool from a flat sheet of plastic stock for supporting a coil of endless magnetic tape for use in a tape cartridge, said method comprising the steps of: piercing a spindle receiving aperture in said sheet at a central axis for said spool, cutting said sheet with generally U-shaped cuts to form hub elements spaced circumferentially about said spindle receiving aperture, bending the hub elements arcuately to have an arcuate curvature and to have radially inward portions, and upstriking said hub elements to form a plurality of generally upstanding hub segments from a flat planar portion of said sheet with said outer portions defining a cylindrical surface of larger diameter than the diameter of a surface defined by said radially inward portions.

* * * * *